(12) United States Patent
Callahan et al.

(10) Patent No.: US 7,087,279 B2
(45) Date of Patent: Aug. 8, 2006

(54) ADHESIVES AND RELEASE LINERS WITH PYRAMIDAL STRUCTURES

(75) Inventors: Kenneth J. Callahan, Shoreview, MN (US); Yaoqi J. Liu, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 83 days.

(21) Appl. No.: 10/621,658

(22) Filed: Jul. 17, 2003

(65) Prior Publication Data

US 2005/0013958 A1 Jan. 20, 2005

(51) Int. Cl.
*B32B 9/00* (2006.01)
(52) U.S. Cl. .................. 428/40.1; 428/41.7; 428/41.8; 428/42.1; 428/156; 428/352; 428/914
(58) Field of Classification Search ............... 428/40.1, 428/41.7, 41.8, 42.1, 156, 914, 352
See application file for complete search history.

(56) References Cited

U.S. PATENT DOCUMENTS

| | | | |
|---|---|---|---|
| RE24,906 E | 12/1960 | Ulrich | |
| 3,239,478 A | 3/1966 | Harlan, Jr. | |
| 3,935,338 A | 1/1976 | Robertson | |
| 4,181,752 A | 1/1980 | Martens et al. | |
| 4,952,650 A | 8/1990 | Young et al. | |
| 5,141,790 A | 8/1992 | Calhoun et al. | |
| 5,169,727 A | 12/1992 | Boardman | |
| 5,296,277 A | 3/1994 | Wilson et al. | |
| 5,362,516 A | 11/1994 | Wilson et al. | |
| 5,650,215 A | 7/1997 | Mazurek et al. | |
| 6,759,110 B1 * | 7/2004 | Fleming et al. | 428/41.8 |
| 6,838,142 B1 * | 1/2005 | Yang et al. | 428/40.1 |

FOREIGN PATENT DOCUMENTS

| | | |
|---|---|---|
| WO | WO 98/29516 | 7/1998 |
| WO | WO 00/69985 | 11/2000 |
| WO | WO 02/14447 | 2/2002 |
| WO | WO 02/074877 | 9/2002 |

* cited by examiner

*Primary Examiner*—Nasser Ahmad
(74) *Attorney, Agent, or Firm*—Colene H. Blank (57) ABSTRACT

An adhesive article includes a release liner and an adhesive layer on the surface of the release liner. The release liner has a surface with an arrangement of structures thereon, wherein the structures extend downward from a plane of the surface. The structures have at least three sidewalls. A first sidewall makes an angle with respect to the plane of the surface of greater than about 0° and less than 90° and a second sidewall makes an angle with respect to the plane of the surface of greater than 0° and less than about 90°. The first sidewall angle differs from the second sidewall angle by more than about 10°.

18 Claims, 7 Drawing Sheets

ADHESIVES AND RELEASE LINERS WITH PYRAMIDAL STRUCTURES

FIELD

This invention relates to articles that include a structured adhesive layer and an optional structured release liner. The invention also relates to a method for applying adhesive compositions to a structured release liner that enhances coatability.

BACKGROUND

Pressure sensitive adhesive backed films may be imaged and adhered to a variety of substrates. For example, large graphics or smaller decals may be placed on vehicles or may be used as signs for identification, promotional or decorative objectives. However, the tacky and aggressive pressure sensitive adhesives used in these applications cause considerable handling and application problems. Ideally, the film is adhered conformably and evenly on the application substrate. Adhesive articles that adhere with the slightest contact can often be particularly difficult to apply if they inadvertently adhere to the substrate in an undesired position. In addition, even if one section of the adhesive article is properly positioned on a substrate, and the film is firmly adhered, air or other fluids may be trapped under the article. The trapped air forms a bubble under the article, and cannot be easily removed without de-bonding or perforating the article.

Structured adhesive layers may be utilized to overcome some of the difficulties associated with the application and repositioning of adhesive articles. Structured adhesive layers can be prepared by coating a structured release liner with a suitable adhesive composition. Upon removal of the release liner, a structured adhesive surface is exposed, which then can be adhered onto a substrate. The structured surface geometry of the release liner, however, can limit the speed at which the liner can be coated. If a structured release liner is coated at too high a coating speed, air bubbles can become trapped between the surface of the release liner and the adhesive. Trapped air bubbles can compromise both the performance and appearance of the adhesive article.

SUMMARY

The release liners of the invention include recessed structures that create inverted protruding structures on an adjacent adhesive layer. The features on the release liner have geometries designed to reduce air bubble formation during coating and increase coating speed. The novel liners can be coated at speeds that exceed those used for coating conventional structured liners without reducing the application, bonding and visual properties of the final adhesive backed article. The recessed structures on the release, liner, which are shaped and spaced to provide enhanced coatability, also enhance adhesion to handling tapes. The corresponding protruding structures on the adhesive layer are shaped and spaced to provide a balance between fluid egress, wetout, and adhesion properties when the adhesive layer is adhered to a substrate and do not compromise the appearance of the final article.

In one aspect, the invention provides an adhesive article that includes a release liner and an adhesive layer on the surface of the release liner. The release liner has a surface with an arrangement of structures thereon, wherein the structures extend downward from a plane of the surface. The structures have at least three sidewalls. A first sidewall makes an angle with respect to the plane of the surface of greater than about 0° and less than 90° and a second sidewall makes an angle with respect to the plane of the surface of greater than 0° and less than about 90°. The first sidewall angle differs from the second sidewall angle by more than about 10°.

In another aspect, the invention provides an adhesive article that includes an adhesive layer having a surface with an arrangement of structures thereon. The structures extend upward from a plane of the surface and have at least three sidewalls. A first sidewall makes an angle with respect to the plane of the surface of greater than about 0° and less than 90° and a second sidewall makes an angle with respect to the plane of the surface of greater than 0° and less than about 90°. The first sidewall angle differs from the second sidewall angle by more than about 10°.

In yet another aspect, the invention provides a release liner having a, surface with an arrangement of structures thereon. The structures extend downward from a plane of the surface and have at least three sidewalls. A first sidewall makes an angle with respect to the plane of the surface of greater than about 0° and less than 90° and a second sidewall makes an angle with respect to the plane of the surface of greater than 0° and less than about 90° wherein the first sidewall angle differs from the second sidewall angle by more than about 10°.

In yet another aspect, the invention provides a method for increasing coating speed. The method includes applying an adhesive to a release liner having a surface with an arrangement of structures thereon. The structures extend downward from a plane of the surface and have at least three sidewalls. At least one of a first sidewall and a third sidewall makes an angle with respect to the plane of the surface of less than about 45°. A second sidewall makes an angle with respect to the plane of the surface of greater than about 45° and less than 85°. The second sidewall angle differs from the first sidewall angle or the third sidewall angle by more than about 20°. The first and third sidewalls are proximal to a leading edge of the adhesive being coated.

In yet another aspect, the invention provides a method of transferring a graphic article. The method includes providing a graphic article including a film with a first surface and a second surface, wherein an image occupies at least a portion of the first surface, an adhesive layer on the second surface of the film, and a release liner on the adhesive layer. The release liner has a surface with an arrangement of structures thereon. The structures extend downward from a plane of the surface and have at least three sidewalls. A first sidewall makes an angle with respect to the plane of the surface of greater than about 0° and less than 90° and a second sidewall makes an angle with respect to the plane of the surface of greater than 0° and less than about 90°. The first sidewall angle differs from the second sidewall angle by more than about 10°. The method includes removing the film and the adhesive layer under portions of the first surface not occupied by the image such that at least a portion of the surface of the release liner is exposed. The method includes attaching a handling tape to the image and the exposed portion of the release liner, and transferring the article into registration with a substrate.

In yet another aspect, the invention provides a release liner with a surface that includes an arrangement of pyramidal depressions, wherein the depressions are capable of adhering to a handling tape at an adhesion value of greater than about 2 N/dm after 5 days at 50° C., as measured by a Prespace Tape Adhesion Test.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 11 A shows a process for applying adhesive to a structured release liner in accordance with the invention.

Like reference symbols in the various drawings indicate like elements.

DETAILED DESCRIPTION

Figure 1:
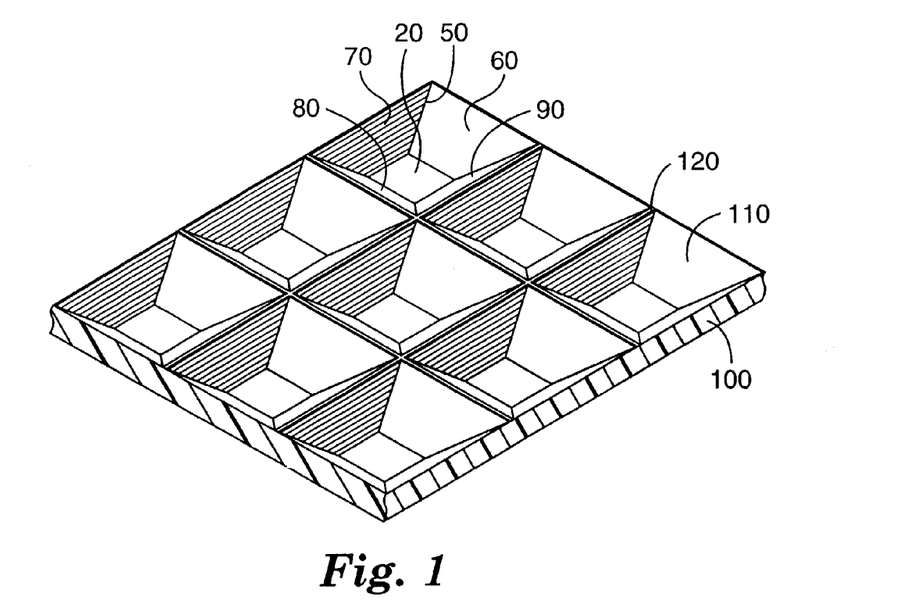
FIG. 1 is a perspective view of a structured release liner.

Referring to FIG. 1, a removable release liner 100 includes a pattern of pyramidal depressions 110 that extend below the plane 120 of the release liner 100. The depressions in the liner 100 may be made as described in WO 98/29516 and U.S. Pat. No. 5,650,215, which are incorporated herein by reference. The topography may be created in the liner 100 by any contacting technique, such as casting, coating or compressing. The topography may be made by at least one of: (1) casting the liner on a tool with a structured pattern, (2) coating the liner onto a tool with a structured pattern, or (3) passing the liner through a nip roll to compress the liner against a tool with a structured pattern. The topography of the tool used to create the structured pattern in the release liner 100 may be made using any known technique, such as, for example, chemical etching, mechanical etching, laser ablation, photolithography, stereolithography, micromachining, knurling, cutting or scoring.

The liner 100 may be any release liner or transfer liner known to those skilled in the art that is capable of being structured as described above. The liner 100 should also be capable of being placed in intimate contact with a pressure sensitive adhesive and subsequently removed without damaging the adhesive layer. Non-limiting examples of liners include materials from 3M Company of St. Paul, Minn., and Loparex of Willowbrook, Ill. The liner 100 is typically a polymer coated paper with a silicone release coating, a polyethylene coated polyethylene terepthalate (PET) film with a silicone release coating, or a cast polypropylene film with a silicone release coating. The liner 100 may also include structures (e.g., glass beads or non-adhesive protrusions) designed to enhance the positionability of the adhesive article such as those in products available from 3M Company under the trade designation CONTROLTAC (not shown in FIG. 1).

The structures in the liner 100 are preferably substantially continuous. The term substantially continuous as used in this application means a pattern of structures that creates a substantially uninterrupted network of channels in the adhesive layer that is applied to the release liner. The continuous pattern of structures either terminates at the peripheral portion of the liner or communicates with other structures that terminate at a peripheral portion of the liner. The continuous structures are preferably substantially linear, and may be overlapping or non-overlapping. The structures in the liner 100 are also preferably substantially regular. The term regular means a pattern of structures that has a regular repeating pattern over at least a portion of the surface of the liner, preferably over the entire surface of the liner.

Figure 2:
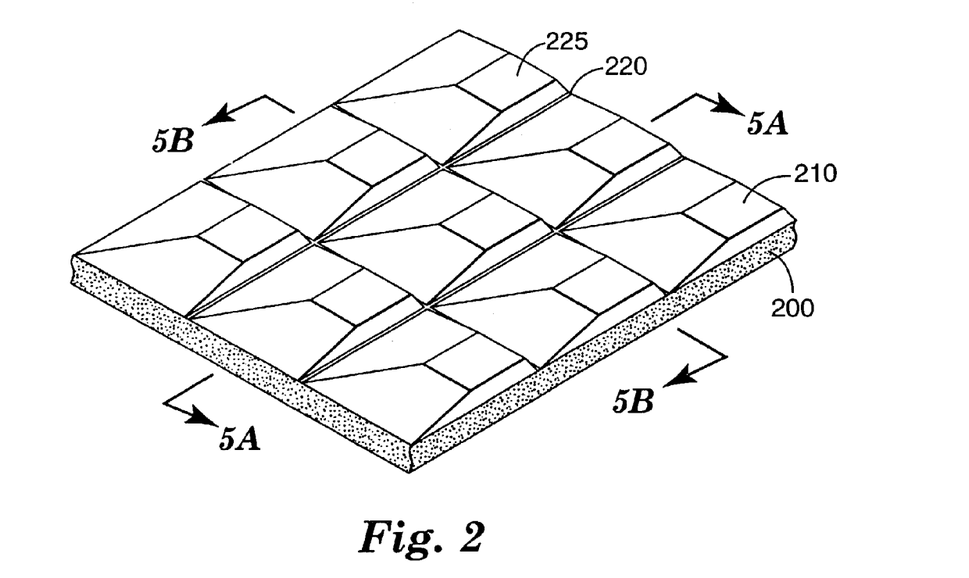
FIG. 2 is a perspective view of a structured adhesive layer.

An adhesive layer may be coated and/or laminated on the structured release liner 100 shown in FIG. 1. When the release liner 100 is removed, the surface of the adhesive layer has a topography that is essentially the inverse of the topography of the surface of the release liner 100. The resulting adhesive layer 200, which is shown in FIG. 2, includes pyramidal protrusions 210 corresponding to the pyramidal depressions 110 in the release liner 100. The pyramidal protrusions 210 extend upward from a plane 220 of the adhesive layer. The adhesive layer may optionally include additional non-adhesive structures such as, for example, those described in U.S. Pat. Nos. 5,296,277; 5,362,516; and 5,141,790, which are all hereby incorporated by reference. These non-adhesive structures are available from 3M Company, St. Paul, Minn, under the trade designation CONTROLTAC (not shown in FIG. 2).

The pyramidal protrusions 210 on the adhesive layer 200 (and the corresponding depressions on the release liner 110) are preferably microscopic in at least two dimensions, i.e. the topical and/or cross-sectional view is microscopic. The term microscopic as used herein refers to dimensions that cannot be resolved by the human eye without aid of a microscope. The pyramidal protrusions/depressions may be present in either a random array or in regular patterns. Selected patterns could include rectilinear patterns, polar patterns and other conventional regular patterns.

The shape of the pyramidal protrusions 210 extending upward from a plane of the surface of the adhesive layer 200 (and the corresponding depressions 110 extending downward from the plane of the release liner 100) can vary widely depending on the intended application of the adhesive layer 200. Structures based on right pyramids, trigonal pyramids, square pyramids, and quadrangle pyramids are particularly preferred. The pyramidal structures may have pointed or truncated tops or tops that form a ridge, and combinations of the different pyramidal shapes can be utilized.

In the release liner, the pyramidal depressions are capable of adhering to a handling tape (e.g., pre-space tape) at an adhesion value of greater than about 2 N/dm after 5 days at 50° C., preferably greater than about 3 N/dm, and most preferably greater than about 5 N/dm, as measured by a Pre-Space Tape Adhesion Test described herein. Low tape-to-liner adhesions, for example less than about 2 N/dm, can result in the tape curling up off of the liner or falling off of the liner without extreme handling precautions.

In the adhesive layer, the pyramidal protrusions are capable of providing fluid egress of greater than about 20 ml/min, preferably greater than about 40 ml/min, at 23° C. under a pressure of 1905 kg/m² of air, as measured according to an Air Bleed Test described herein. Adhesives coated at coating speeds exceeding about 9 meters/minute are capable of providing peel adhesion values of greater than about 50 N/dm, as measured according to a 180° Peel Adhesion Test.

Figure 3:
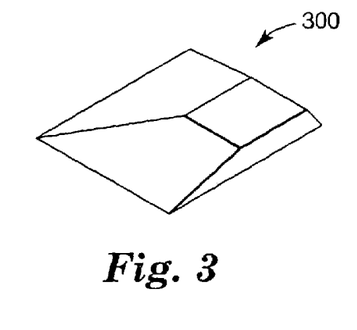
FIG. 3 is a perspective view of one embodiment of a truncated structure on an adhesive layer in accordance with the invention.
Figure 4:
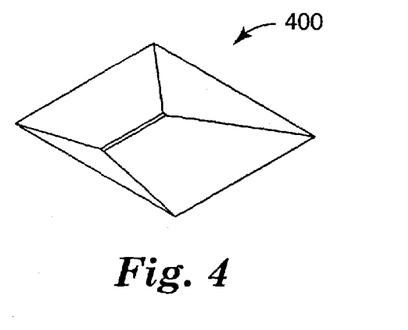
FIG. 4 is a perspective view of one embodiment of a structure having a ridge on an adhesive layer in accordance with the invention.

FIG. 3 illustrates a square pyramidal structure 300 as an illustration of one embodiment suitable for use as a protrusion 210 in the adhesive layer 200. FIG. 4 depicts a square pyramidal structure 400 that may also be used as a protrusion 210 in the adhesive layer 200.

The protrusions 210 in the adhesive layer 200 (and the corresponding depressions in the release liner 100) are preferably arranged in a regular array. The regular array either terminates at the peripheral portion of the adhesive layer 200 (or the liner 100) or communicates with other structures that terminate at a peripheral portion thereof. The term regular array refers to a regular repeating pattern over at least a portion of the surface of the adhesive layer (or release liner), preferably over the entire surface.

As described in WO 98/29516, incorporated herein by reference, the pyramidal protrusions 210 (See FIG. 2) should be sized according to the following general design considerations. First, the protrusions should preferably be sufficiently large to allow egress of fluids to the periphery of the adhesive layer for exhaustion into the surrounding atmosphere, but not so large as to allow ingress of unwanted fluids beneath the adhesive layer. Second, the protrusions 210 should also not be so large as to detract from the appearance of an exposed surface of a film adhered to the adhesive layer, particularly if the film is to be imaged. Third, the protrusions 210 should not be so large as to detract from the adhesive bonding performance of the adhesive layer.

Figure 5A:
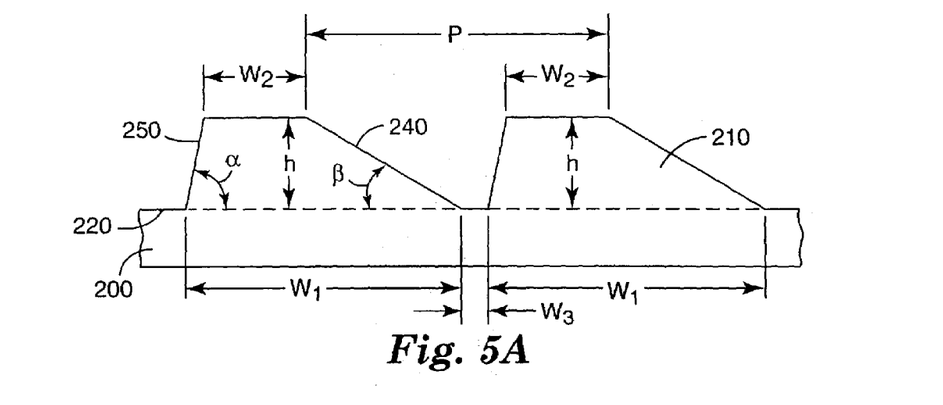
FIG. 5A is a cross-sectional view along the AA direction of the adhesive layer of FIG. 2.
Figure 5B:
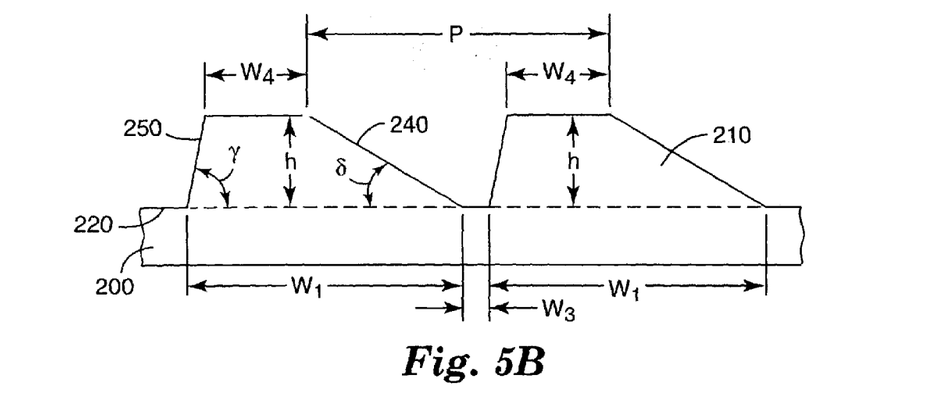
FIG. 5B is a cross-sectional view along the BB direction of the adhesive layer of FIG. 2.

Referring to FIG. 5A, a section of the adhesive layer 200 along line AA of FIG. 2 and along line BB (FIG. 5B) of FIG. 2 is shown that includes a plurality of protrusions 210 extending above the plane 220 of the adhesive layer. The dimensions of the protrusions may vary widely depending on the intended application of the adhesive layer and the release liner, and should be selected to provide adequate balance between adhesion to substrate, fluid egress, and adhesion of the corresponding depressions in the release liner to handling tapes. The pitch P between the protrusions 210 is generally less than about 2500 micrometers. The pitch P will depend on the intended application. For example, if optical clarity is important, then the pitch typically is less than about 350 micrometers. The height h of each protrusion 210 from a plane 220 of the adhesive layer 200 is preferably greater than about 5 micrometers and up to about 35 micrometers, more preferably about 10 micrometers to about 25 micrometers. The width $W_1$ of the protrusion 210 at its base can be greater than about 75 micrometers and less than about 350 micrometers. In some embodiments, the width $W_1$ can range from about 350 micrometers to about 2500 micrometers.

The lengths $W_2$ and $W_4$ may vary widely depending on the desired balance between adhesion to the substrate, fluid egress and release liner handling tape adhesion, and should typically be less than about 50% of the width of the base $W_1$. $W_2$ and $W_4$ may be of equal length or may be of different lengths. Preferably, $W_2$ and $W_4$ are about 0 micrometers (pointed top) to about 100 micrometers (truncated), more preferably about 10 micrometers to about 85 micrometers. A protrusion in which $W_2$ and $W_4$ are not of the same length has a skewed pyramidal structure with a substantially trapezoidal cross-sectional shape in at least one direction (FIG. 4). Referring again to FIG. 2, $W_2$ and $W_4$ define an area (A) 225. The percentage of area (A) to total surface area (T) determines the initial contact area for the adhesive on the supporting substrate, where T is the total surface area that would contact a substrate if the adhesive were not structured. Typically, the adhesive layer 210 has an initial contact area of less than about 35%, preferably less than about 25%. In some embodiments, the adhesive layer has an initial contact area approaching 99%. Where the initial contact area approaches 99%, the gap $W_3$ between the pyramidal protrusions 210 can be about 0 micrometers to about 100 micrometers, more preferably about 2 micrometers to about 50 micrometers. In embodiments where the initial contact area is less than about 35%, gap $W_3$ can range from about 0 micrometers to about 4 micrometers.

The protrusions 210 have at least one sidewall 230 that makes an angle α with respect to a plane 220 of the surface of the adhesive layer 210 and one sidewall 240 that makes an angle β with respect to a plane 220 of the surface of the adhesive layer 200. The angle α differs from the angle β by more than about 10°, preferably more than about 20°, and more preferably by more than about 30°. The angle α is selected from an angle greater than about 0° and less than about 90°, preferably about 45° to about 85°, and more preferably greater than about 50° and less than about 70°. The angle β is selected from an angle of greater than about 0° and less than about 90°, more preferably less than about 50°, and more preferably less than about 35°. The protrusions can have a sidewall 250 that makes an angle γ with respect to a plane 220 of the surface of the adhesive layer 200 and a sidewall 260 that makes an angle δ with respect to a plane 220 of the surface of the adhesive layer 200. The angle γ and the angle δ are selected from an angle greater than about 0° and less than about 90°, and can be the same or can be different from the angle α and the angle β. In the embodiment shown in FIGS. 5A and 5B, the angle α and the angle γ are substantially equal (i.e., typically about ±5° depending on the rheology of the adhesive and the tolerance of the depressions within the release liner used to prepare the structured adhesive layer), and the angle β and the angle δ are substantially equal and differ from the angle α and the angle γ by more than about 10°.

Figure 6:
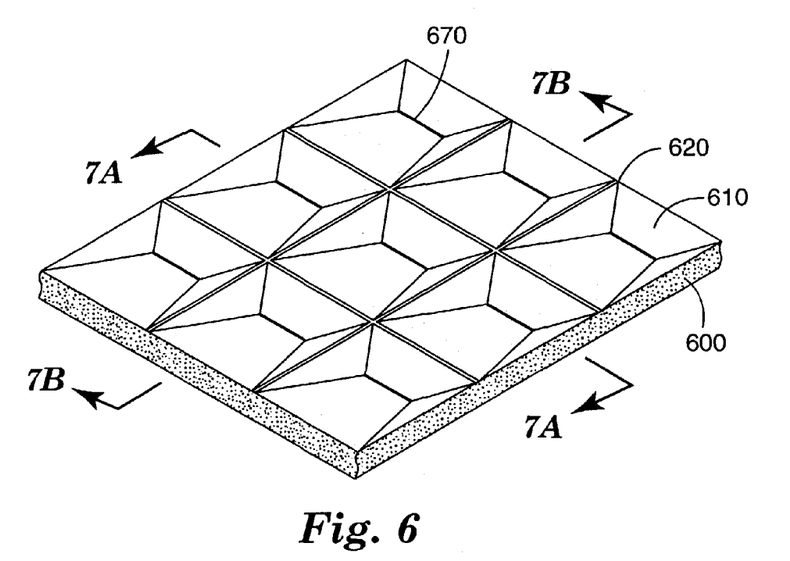
FIG. 6 is a perspective view of one embodiment of a structure on an adhesive layer in accordance with the invention.
Figure 7A:
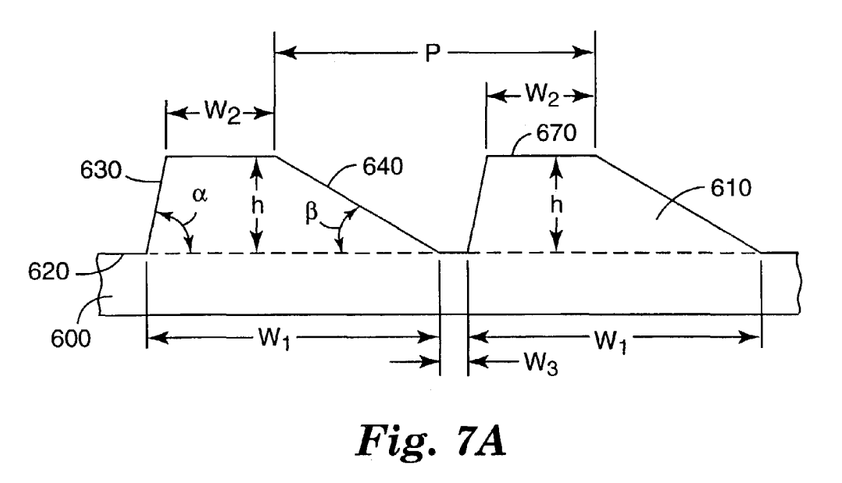
FIG. 7A is a cross-sectional view along the AA direction of the adhesive layer of FIG. 6.
Figure 7B:
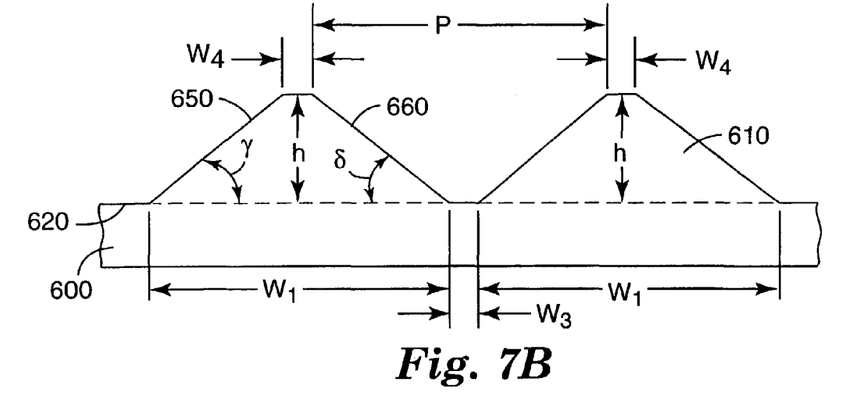
FIG. 7B is a cross-sectional view along the BB direction of the adhesive layer of FIG. 6.

Referring to FIG. 6, an adhesive layer 600 includes pyramidal protrusions 610 corresponding to pyramidal depressions in the release liner (not shown). The pyramidal protrusions 610 extend upward from a plane 620 of the adhesive layer. Referring to FIG. 7A and 7B, sections of the adhesive layer 600 along line AA (FIG. 7A) of FIG. 6 and along line BB (FIG. 7B) of FIG. 6 are shown that include a plurality of protrusions 610 extending above the plane 620 of the adhesive layer. The protrusions 610 have at least one sidewall 630 that makes an angle α with respect to a plane 620 of the surface of the adhesive layer 600 and one sidewall 640 that makes an angle β with respect to the surface of the adhesive layer 610. The angle α differs from the angle β by more than about 10°, preferably more than about 20°, and more preferably by more than about 30°. In the embodiment depicted in FIGS. 7A and 7B, the protrusions 610 have a sidewall 650 that makes an angle γ with respect to a plane 620 of the surface of the adhesive layer 600 and a sidewall 660 that makes an angle δ with respect to a plane 620 of the surface of the adhesive layer 600. The angle γ and the angle δ can be the same or can be different and can be the same or different from the angle α and the angle β. The angles β, γ, and δ are substantially equal (i.e., typically about +5° depending on the rheology of the adhesive and the tolerance of the depressions within the release liner used to prepare the structured adhesive layer). The angle α differs from the angles β, γ, and δ by more than about 10°. The protrusions 610 have a substantially trapezoidal cross-section in the AA direction and a substantially pyramidal cross-section in a BB direction, such that the top of the protrusions 610 form a ridge 670 (shown in FIG. 6) that is substantially parallel to the plane of the surface of the adhesive.

Figure 8A:
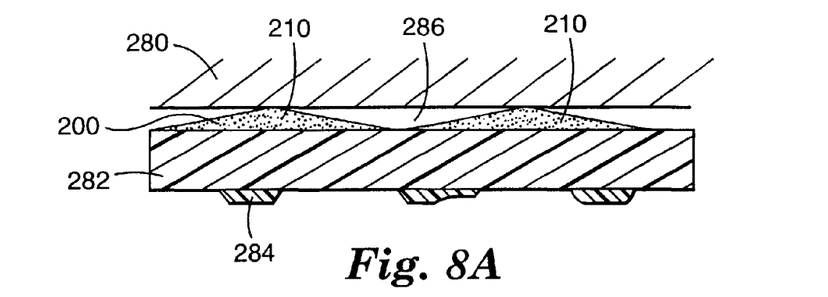
FIG. 8A is a cross-sectional view of a graphic article as it is initially contacted with a substrate.
Figure 8B:
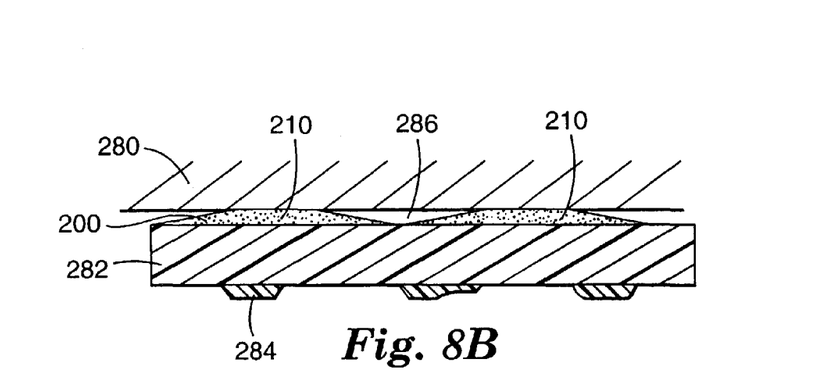
FIG. 8B is a cross-sectional view of a graphic article after adequate adhesion to a substrate has been achieved.

Referring to FIGS. 8A and 8B, once the release liner 100 (not shown) is removed, the exposed surface of the structured adhesive layer 200 may be adhered to a variety of substrates 280. The surface of the adhesive layer opposite the structured surface typically includes a film layer 282, which includes an image layer 284. Referring to FIG. 8A, as the adhesive layer 200 is initially contacted with the substrate 280, the pyramidal protrusions 210 contact the surface of the substrate, and the areas 286 between the protrusions 210 function as channels for fluid egress. This allows pockets of trapped air between the adhesive layer and the substrate to be easily removed. Referring to FIG. 8B, after adequate application consistent with techniques known in the art, increased adhesive wetout will occur and the areas 286 will decrease in size or disappear completely. Examples of suitable substrates 280 include glass, metal, plastic, wood, and ceramic substrates, painted surfaces of these substrates, imaged films, sign faces, and the like. Representative plastic substrates include polyvinyl chloride, ethylene-propylene-diene monomer rubber, polyurethanes, polymethyl methacrylate, engineering thermoplastics (e.g., polyphenylene oxide, polyetheretherketone, polycarbonate), and thermoplastic elastomers.

The film 282 may vary widely depending on the intended application, and may be made of a wide variety of materials such as, for example, polymers, metal foils, metal plates, ceramic plates, foamed sheets, and reflective sheeting. The film 282 is preferably made of a polymeric material used conventionally by those skilled in the art. Suitable polymeric films include, for example, vinyl, polyvinyl chloride, plasticized polyvinyl chloride, polyurethane, polyethylene, polypropylene, fluororesin and the like. The thickness of the film 282 can vary widely according to a desired application, but is usually about 300 micrometers or less, and preferably about 25 micrometers to about 100 micrometers.

Any pressure sensitive adhesive is suitable for the adhesive layer 210. Classes of pressure sensitive adhesives include acrylics, tackified rubber, tackified synthetic rubber, ethylene vinyl acetate, olefins, block copolymers, urethanes, vinyl ethers, silicone, and the like. Suitable acrylic adhesives are disclosed, for example, in U.S. Pat. Nos. 3,239,478, 3,935,338, 5,169,727, RE 24,906, 4,952,650, and 4,181,752, which are hereby incorporated by reference. A suitable class of pressure sensitive adhesives is the reaction product of at least one alkyl acrylate with at least one reinforcing comonomer. Suitable alkyl acrylates are those having a homopolymer glass transition temperature below about −10° C. and include, for example, in-butyl acrylate, 2-ethylhexylacrylate, iso-octylacrylate, isononyl acrylate, octadecyl acrylate and the like. Suitable reinforcing monomers include, for example, acrylic acid, itaconic acid, isobornyl acrylate, N,N-dimethylacrylamide, N-vinyl caprolactam, N-vinyl pyrrolidone, and the like.

The adhesive composition and rheology of the adhesive layer 210 should be selected to provide the desired degree of wetout between the adhesive layer 210 and the substrate 280, as well as the retention of the fluid egress channels 286. The adhesives may be polymers that are dispersed in solvent or water, coated onto the release liner, dried, and optionally crosslinked. If a solvent-borne or water-borne pressure sensitive adhesive composition is employed, then the adhesive layer may undergo a drying step to remove all or a majority of the carrier liquid. Additional coating steps may be necessary to achieve a smooth surface. The adhesives may also be hot melt coated onto the microstructured liner or backing. Additionally, monomeric pre-adhesive compositions can be coated onto the liner and polymerized with ail energy source such as heat, UW radiation, e-beam radiation, and the like. The thickness of the adhesive may vary widely depending on the intended application, and typically ranges from about 10 micrometers to about 50 micrometers.

The pressure sensitive adhesive can optionally include one or more additives such as, for example, initiators, fillers, plasticizers, tackifiers, chain transfer agents, fibrous reinforcing agents, woven and non-woven fabrics, foaming agents, antioxidants, stabilizers, fire retardants, viscosity enhancing agents, coloring agents, and mixtures thereof.

Figure 9:
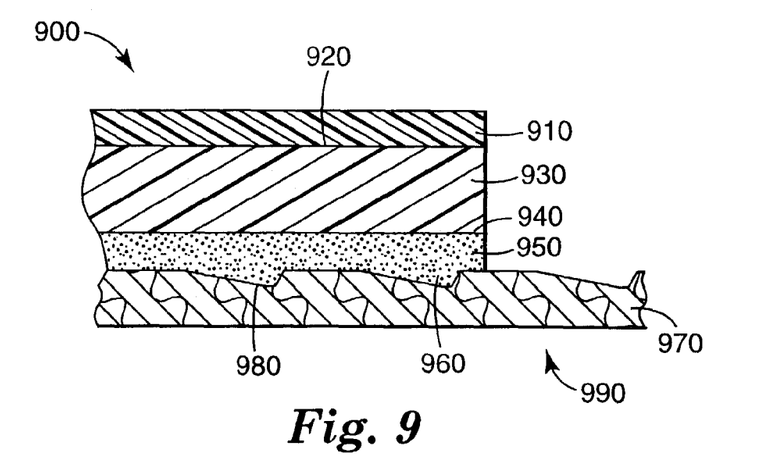
FIG. 9 is a cross-sectional view of the adhesive backed article with portions of the film layer and adhesive layer cut away to expose the release liner.

Referring to FIG. 9, a graphic article 900 is shown that includes a graphic 910 imaged on a first surface 920 of a film layer 930. A second surface 940 of the film layer 930 lies adjacent to the structured adhesive layer 950. The adhesive layer 950 includes pyramidal protrusions 960. The adhesive layer 950 is protected by a removable structured release liner 970, which includes depressions 980 corresponding to the protrusions 960. In FIG. 9, the film layer 930 and the adhesive layer 950 have been carefully cut away around the graphic 910. The area of the film 930 and adhesive 950 not overlain by the graphic 910 have been removed to expose a portion 990 of the structured surface of the release liner 970.

Figure 10:
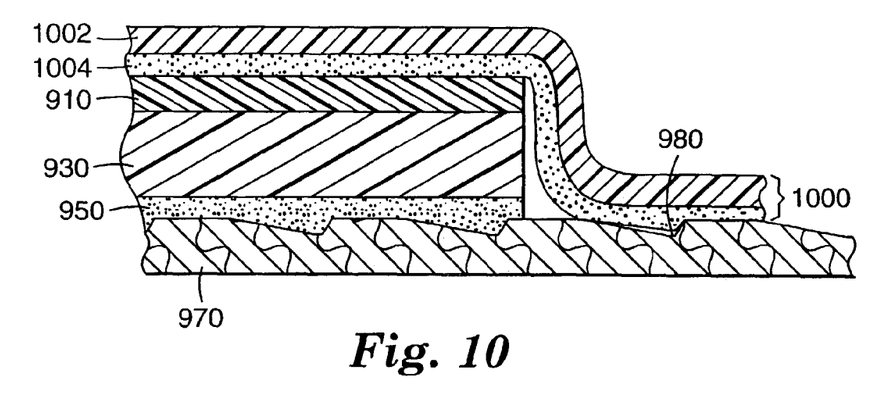
FIG. 10 is a cross-sectional view of the adhesive backed article of FIG. 9 with a second protective or transfer backing applied thereto.

As shown in FIG. 10, once the film and adhesive not overlain by the graphic 910 are removed, a second tape 1000 may be applied over the graphic 910 and/or the release liner 970. The tape 1000 may be used to protect the graphic 910 from damage during handling, or may be a pre-mask or pre-space tape to facilitate transfer and registration of the construction 900 with respect to a substrate. The tape 1000 may also be a splicing tape used to temporarily join the release liner 970 to another release liner (not shown in FIG. 10). Generally, the tape 1000 includes a backing layer 1002 and an adhesive layer 1004. The tape 1000 may also include other layers depending on its intended function, and these layers will not be detailed here. When the tape 1000 contacts the release liner 970, the backing layer 1002 is typically sufficiently stiff that the tape adhesive layer 1004 cannot completely conform to the topography of the release liner 970. This results in lower adhesion between the tape 1000 and the release liner 970. The shape and spacing of the depressions 980 in the release liner 970 are selected to enhance adhesion between the release liner 970 and the handling tape 1000.

Figure 11A:
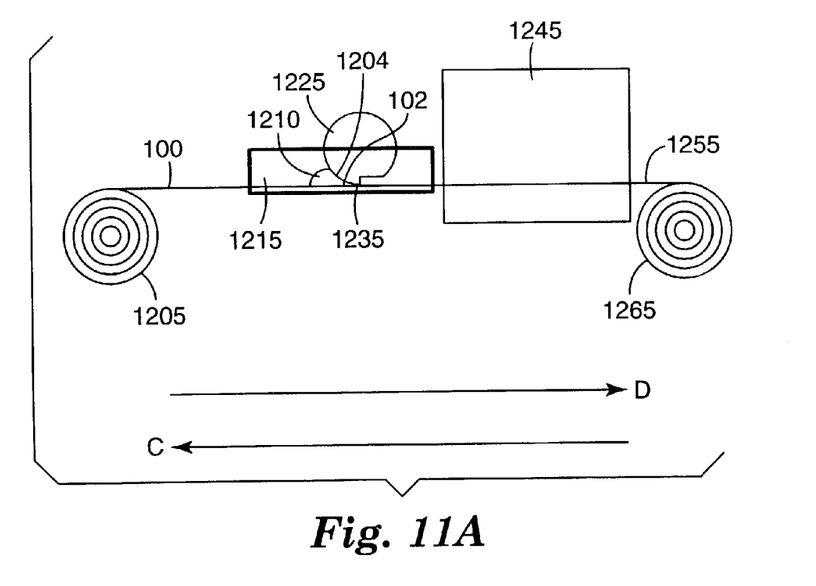
Figure 11B:
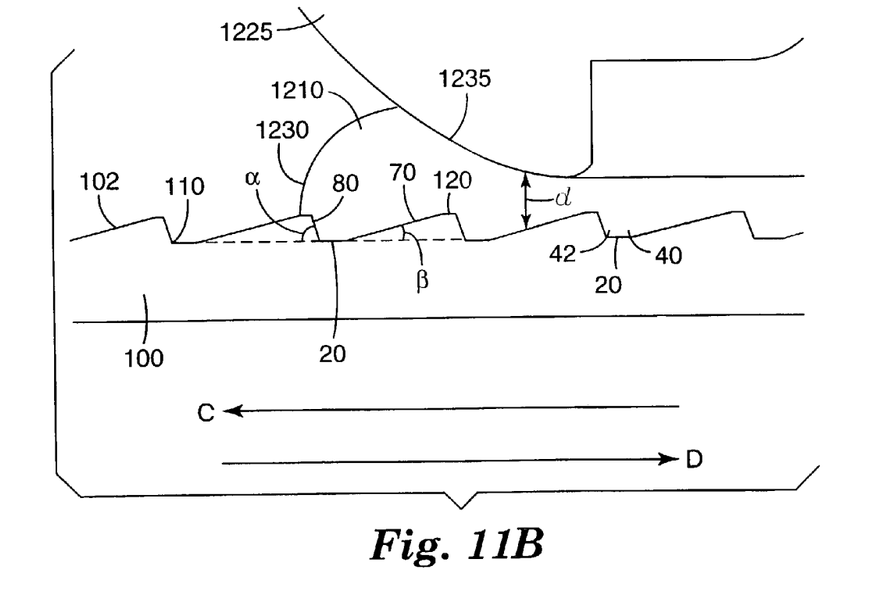
FIG. 11B is an expanded view of the coating process shown in FIG. 11A.

Adhesive articles can be made by applying an adhesive to the structured release liner using conventional coating methods. For example, structured release liners can be coated by, e.g., knife, slot, or bar coating solutions of a pressure sensitive adhesive onto a structured surface of the release liner. Referring to FIG. 11A, a continuous knife coating process is shown in which a structured release liner 100 according to the invention is unwound from an unwind station 1205 and is pulled in a direction D through a coating station 1215 that includes a knife coater 1225. As liquid adhesive solution 1210 is applied onto the surface 102 on the unwind side Of the release liner 100, a rolling bank of adhesive solution is formed between the liner 100 and the unwind side 1204 of the knife edge 1235 of knife coater 1225. Referring to FIG. 11B, as the release liner 100 passes beneath the knife edge 1235 of the knife coater 1225, the amount of adhesive solution 1210 that is deposited onto the surface 102 of the release liner 100 is maintained by adjusting the distance (i.e., gap height) (d) between the knife edge 1235 of the knife coater 1225 and the surface 102 of the liner. Referring to FIG. 11A, the adhesive coated release liner 1255 exits the coating station 1215 and passes through an optional drying station (e.g., an oven) 1245 to drive off any residual solvent (if present) in the adhesive layer (not shown). A release liner or film layer (not shown) optionally can be applied to the exposed adhesive surface of the coated liner 1255. The adhesive coated release liner 1255 then can be wound up on a windup station 1265.

Figure 12:
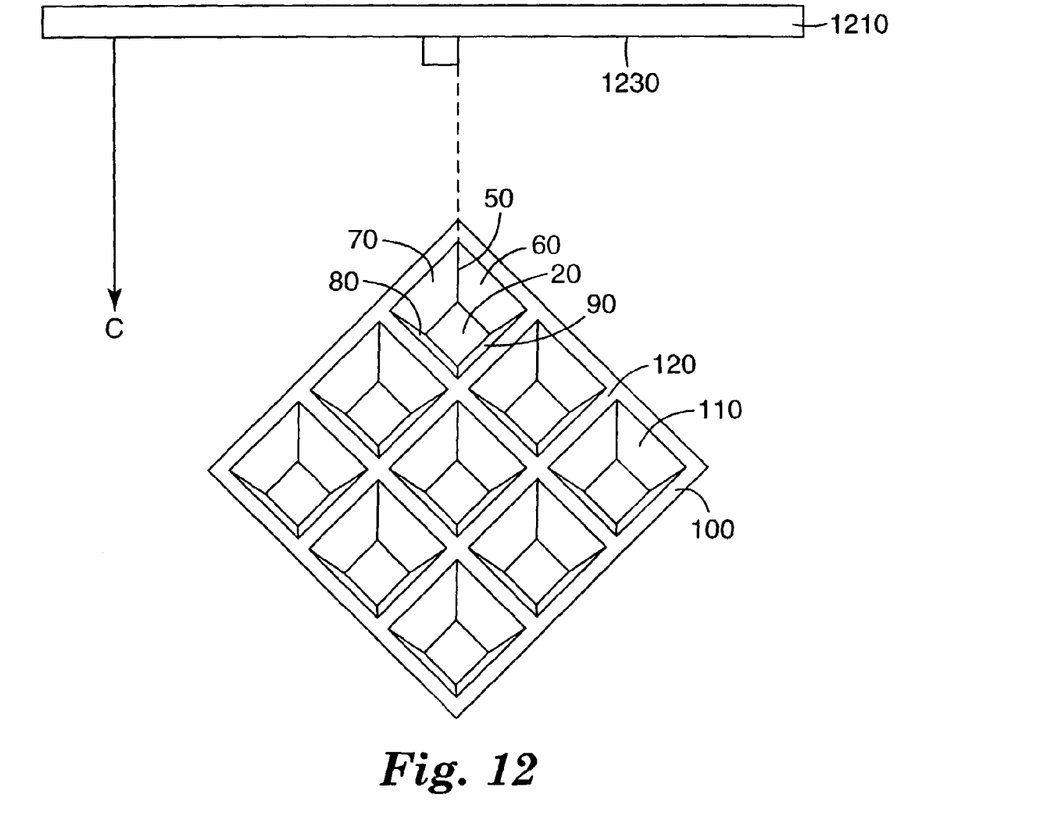
FIG. 12 shows the orientation of a release liner during the coating process shown in FIG. 11A.

Referring to FIGS. 11B and 12, in the coating method according to the invention, the structured release liner 100 is oriented at a bias relative to the leading edge 1230 of the liquid adhesive 1210 so as to minimize entrapping air bubbles between the release liner 100 and the adhesive. The structured release liner 100 includes structures 110 that are shaped to reduce air bubble formation during coating operations. The release liner 100 can include skewed square pyramidal depressions 110, in which each depression has two sidewalls 60 (not shown in FIG. 11B) and 70 that make a relatively shallow angle $\beta$ (not shown in FIG. 12) with respect to the plane of the surface 120 of the release liner 100 and two sidewalls 80 and 90 (not shown in FIG. 11B) that make an angle $\alpha$ (not shown in FIG. 12) that is relatively steep with respect to the plane of the surface 120 of the liner 100. Referring to FIG. 12, the release liner 100 is oriented so that the lateral edge 50 between sidewall 60 and sidewall 70 of structure 110 is substantially perpendicular to the leading edge 1230 of the rolling bank of liquid adhesive solution 1210.

Referring again to FIGS. 11A and 11B, as liquid adhesive solution 1210 is applied to the structured surface 102 of the release liner 100, the adhesive solution 1210 flows in a direction C into the depressions 110 (not shown in FIG. 11A) in the structured release liner 100. Referring to FIGS. 11B and 12, the liquid adhesive 1210 passes over the relatively shallow sidewalls 60 (not shown in FIG. 11B) and 70, flows over land area 20, and then flows up the relatively steep sidewalls 80 and 90 (not shown in FIG. 11B). The adhesive solution 1210 advances in a direction C to coat the entire surface of the liner 100 and create a substantially continuous adhesive layer thereon. Referring to FIG. 11B, at high coating speeds, as the leading edge 1230 of the liquid adhesive 1210 advances over structure 110, air bubbles may become trapped in an area 40 at the front of the structure 110. In addition, as the leading edge 1230 advances over the structure 100 and begins to fill in the land area 20, air bubbles may also become trapped at an area 42 at the back of the structure 110. By orienting the structured release liners of the invention so that shallower sidewall angles are presented at a bias relative to the leading edge of the adhesive solution first, followed by steeper sidewall angles, air bubbles are less likely to be entrapped in the final adhesive backed article. Since less air is entrapped in areas around the features during coating, these release liners may be coated at higher speed than conventional structured release liners.

Once the pressure sensitive adhesive layer is coated Onto the release liner, it may be laminated to a backing layer to provide an adhesive backed article. The backing may be a film or a rigid substrate. Examples of suitable films include metal films, polymer films such as polyester (PET), polyolefin (polypropylene or polyethylene), polyvinyl chloride, ethylene-propylene-diene monomer rubber, polyurethanes, polymethyl methacrylate, engineering thermoplastics (e.g., polyphenylene oxide, polyetheretherketone, polycarbonate), thermoplastic elastomers, paper, nonwoven webs, or another non-structured release liner. Examples of rigid substrates include glass, metals, plastic, wood, ceramic substrates, sign faces, painted surfaces of these substrates, and the like.

The invention will now be described with reference to the following non-limiting examples.

EXAMPLES

These examples are merely for illustrative purposes and are not meant to limit the scope of the appended claims. All parts, percentages, ratios, etc. in the examples and the rest of the specification are by weight unless indicated otherwise.

Table of Abbreviations

| Abbreviation or Trade Name | Description |
| --- | --- |
| COMPLY 20C30 | Commercially available paper liner with structured PE coating; 3M Company, St. Paul, MN |
| COMPLY 150C30 | Commercially available paper liner with structured PE coating; 3M Company, St. Paul, MN |
| PSA-1 | Iso-octyl acrylate/acrylic acid (93/7) copolymer blended with 14% by weight of NIREZ 2019 as a 27% solids solution in ethyl acetate and heptane mixture. |
| Prespace Tape | 3M Prespace Tape SCPS-55, commercially available from 3M Company, St. Paul, MN |
| PET Film | Polyester (polyethylene terephthalate) film having a thickness of 38 micrometers (1.5 mils) |
| NIREZ 2019 | Terpene phenolic tackifier resin, commercially available from Arizona Chemical, Panama City, FL |

180° Peel Adhesion Test

This peel adhesion test is similar to the test method described in ASTM D 3330 (Test Method A), substituting a glass substrate for the stainless steel substrate described in the test. PET/adhesive/Microstructured liner tape constructions were cut into 2.54 centimeter by 15 centimeter strips. The release liner was removed and each strip was adhered to a 15 centimeter by 30 centimeter glass plate (cleaned with 1 diacetone alcohol and 3 ethanol washes, then dried) using a 2-kilogram roller passed twice over the strip. The bonded assembly dwelled at room temperature for one hour and was tested for 180° peel adhesion using an IMASS slip/peel tester (SP2000, commercially available from Instrumentors Inc., Strongsville, Ohio) at a rate of 30.4 centimeters/minute (12 inches/minute) over a five second data collection time. Four examples were tested for each sample; the reported peel adhesion value is an average of the peel adhesion values for the four examples.

Prespace Tape Adhesion Test

Samples of the Prespace Tape were laminated to the liner to be tested with a roll pressure of 414 KiloPascals (60 psi). Test samples of 5.1 centimeters (2 inches) width were cut and peeled using the 180° Peel test method described above. Tests were run immediately (one hour dwell; listed as initial test), after aging under CTH (constant temperature (21° C.) and humidity (50% relative humidity)) for 1 day (listed as 1 day at CTH), and at 50° C. for 5 days (listed as 5 days at 50° C.).

Air Bleed Test

Square tape samples (PET/adhesive/Microstructured liner constructions) of 15.2 centimeters×15.2 centimeters (6 inch×6 inch) were cut. The liners were removed and the exposed tape sample was applied to a platen, which has 2 concentric grooves cut into it and adhered by applying a 1235 gram (2.7 pound) roller. Air is supplied to the outer groove via an inlet, which has a meter to measure pressure of air supplied. Air travels from the outer groove through channels in the adhesive to the inner groove and pass through an outlet hole in the inner groove to a flow-meter, which measures the airflow through this outlet hole. Airflow was measured at 3 different air pressures, either 508, 1016 and 1270 Kilograms/meter$^2$ (20, 40, 50 inches of water) or 508, 1016 and 1905 Kilograms/meter$^2$ (20, 40, 75 inches of water) and the airflows were recorded in milliliters per minute.

Wetout Test

Tape samples (PET/adhesive/Microstructured liner constructions) of area 5.1 centimeters$^2$ were applied backing side down to a flat disk that contained an epoxy adhesive that upon curing resists deformation. After curing the liner was removed to expose the microstructured adhesive. The disk was mounted such that the microstructured adhesive faced a probe tip of area 2.32 millimeters$^2$ normal to the adhesive face. The probe tip is mounted to a transducer that accurately measures the contact force. The disk and adhesive sample were transparent so that a camera mounted to the backside of the sample could record the approach, contact and wetout when the probe tip was moved toward the sample. Complete Wetout is taken to be the point at which the adhesive has a uniform appearance over the probe tip contact area and the microstructuring is no longer visible. The displacement (in micrometers) and force (in grams) at this point is reported as the wetout value.

Liner Preparation

Microstructured liners were prepared on CONTROLTAC PE coated paper liner. In addition, two commercially available 3M products were also evaluated and their descriptions are outlined in Table A. Angles for each sidewall are listed as α, β, γ, and δ. Note that the two standard liners (COMPLY 20C30 and COMPLY 150C30) have all four angles of 30°, whereas the liners of the invention have variable sidewall angles. As a result, asymmetry is introduced. All liners were made so that the microstructuring is at a 45° bias to the machine direction of the liner.

TABLE A

| Liner | LPI | Pitch (μm) | α | β | γ | δ |
|---|---|---|---|---|---|---|
| 20C30 | 20 | 1270 | 30° | 30° | 30° | 30° |
| Liner A | 20 | 1270 | 60° | 30° | 30° | 30° |
| Liner B | 20 | 1270 | 60° | 30° | 60° | 30° |
| 150C30 | 150 | 169 | 30° | 30° | 30° | 30° |
| Liner C | 146 | 174 | 60° | 10° | 10° | 10° |
| Liner D | 146 | 174 | 60° | 10° | 60° | 10° |

LPI = Lines per inch

Examples 1–8 and Comparative Examples C1–C2

Tape samples were prepared by knife coating solutions of PSA-1 onto Liners A and B and commercial liner COMPLY 20C30 to yield 8.6 grains/(2 inch×12 inch), equivalent to about 1.5 mils thickness. The liners were coated with either the 30°/30°, 60°/30° or 60°/60° sidewall slopes leading at a speed of either 9.1 meters per minute (30 feet per minute) or 27.4 meters per minute (90 feet per minute) as shown in Table 1. The coated liners were dried at 88° C. (variable residence time depending on line speed) and laminated to PET film to provide PET/adhesive/Microstructured liner constructions. The liners were removed from these constructions and 180° Peel tests were run using the test method described above, the results are shown in Table 1.

TABLE 1

| Example | Liner | Leading Edge | Coating Speed (meters/minute) | 180° Peel (N/dm) |
|---|---|---|---|---|
| C1 | COMPLY 20C30 | 30°/30° | 9.1 | 54.7 |
| C2 | COMPLY 20C30 | 30°/30° | 27.4 | 54.7 |
| 1 | Liner A | 30°/30° | 9.1 | 63.5 |
| 2 | Liner A | 30°/30° | 27.4 | 63.5 |
| 3 | Liner A | 60°/30° | 9.1 | 62.4 |
| 4 | Liner A | 60°/30° | 27.4 | 62.4 |
| 5 | Liner B | 30°/30° | 9.1 | 63.5 |
| 6 | Liner B | 30°/30° | 27.4 | 61.3 |
| 7 | Liner B | 60°/60° | 9.1 | 59.1 |
| 8 | Liner B | 60°/60° | 27.4 | 60.2 |

Examples 9–20 And Comparative Example C3–C5

Tape samples were prepared by knife coating solutions of PSA-1 onto the Liners C and D and commercial liner COMPLY 150C30 to yield 8.6 grains/(2 inch×12 inch)–equivalent to about 1.5 mils thickness. The liners were coated with either the 30°/30°, 10°/10°, 60°/10° or 60°/60° sidewall slopes leading at a speed of either 1.5 meters per minute (5 feet per minute), 9.1 meters per minute (30 feet per minute) or 18.2 meters per minute (60 feet per minute) as shown in Table 2. The coated liners were dried at 88° C. (variable residence time depending on line speed) and laminated to PET film to provide PET/adhesive/Microstructured liner constructions. The liners were removed from these constructions and 180° Peel tests were run using the test method described above, the results are also shown in Table 2.

TABLE 2

| Example | Liner | Leading Edge | Coating Speed (meters/minute) | 180° Peel (N/dm) |
|---|---|---|---|---|
| C3 | COMPLY 150C30 | 30°/30° | 1.5 | 49.2 |
| C4 | COMPLY 150C30 | 30°/30° | 9.1 | 48.1 |
| C5 | COMPLY 150C30 | 30°/30° | 18.2 | 35.0 |
| 9 | Liner C | 10°/10° | 1.5 | 64.5 |
| 10 | Liner C | 10°/10° | 9.1 | 58.0 |
| 11 | Liner C | 10°/10° | 18.2 | 64.5 |
| 12 | Liner C | 60°/10° | 1.5 | 61.3 |
| 13 | Liner C | 60°/10° | 9.1 | 60.2 |
| 14 | Liner C | 60°/10° | 18.2 | 61.3 |
| 15 | Liner D | 10°/10° | 1.5 | 64.5 |
| 16 | Liner D | 10°/10° | 9.1 | 58.0 |
| 17 | Liner D | 10°/10° | 18.2 | 60.2 |
| 18 | Liner D | 60°/60° | 1.5 | 59.1 |
| 19 | Liner D | 60°/60° | 9.1 | 64.5 |
| 20 | Liner D | 60°/60° | 18.2 | 60.2 |

Examples 21–24 And Comparative Examples C6–C7

Samples of the liners A–D and the commercial liners COMPLY 20C30 and COMPLY 150C30 were tested for Prespace Tape Adhesion according to the test method described above. The results are shown in Table 3.

TABLE 3

| Example | Liner | Initial (N/dm) | 1 day at CTH (N/dm) | 5 days at 50° C. (N/dm) |
|---------|-------|----------------|----------------------|--------------------------|
| C6 | COMPLY 20C30 | 0.60 | 1.23 | 6.47 |
| 21 | Liner A | 0.75 | 1.62 | 5.78 |
| 22 | Liner B | 0.40 | 0.87 | 2.96 |
| C7 | COMPLY 150C30 | 0.13 | 0.33 | 0.44 |
| 23 | Liner C | 0.54 | 1.12 | 5.33 |
| 24 | Liner D | 0.39 | 0.67 | 2.23 |

Examples 25–28 And Comparative Examples C8–C9

Tape samples described in previous examples were tested for Air Bleed according to the test method described above. The results are shown in Table 4.

TABLE 4

| Example | Example Tape | Air Flow at air pressure 508 Kg/m$^2$ (ml/min) | Air Flow at air pressure 1016 Kg/m$^2$ (ml/min) | Air Flow at air pressure 1270 Kg/m$^2$ (ml/min) | Air Flow at air pressure 1905 Kg/m$^2$ (ml/min) |
|---------|--------------|---|---|---|---|
| C8 | C1 | 6 | 16 | NM | 41 |
| 25 | 3 | 6 | 14 | NM | 33 |
| 26 | 7 | 4 | 9 | NM | 22 |
| C9 | C3 | 16 | 44 | 75 | NM |
| 27 | 9 | 5 | 23 | 41 | NM |
| 28 | 15 | 8 | 32 | 50 | NM |

NM = not measured

Examples 29–30 And Comparative Example C10

Tape samples described in previous examples were tested for Wetout according to the test method described above. The results are shown in Table 5.

TABLE 5

| Example | Example Tape | Force at Wetout (grams) | Displacement at Wetout (micrometers) |
|---------|--------------|-------------------------|---------------------------------------|
| C10 | C3 | 187 | 15.0 |
| 29 | 9 | 115 | 6.4 |
| 30 | 15 | 184 | 9.8 |

A number of embodiments of the invention have been described. Nevertheless, it will be understood that various modifications may be made without departing from the spirit and scope of the invention. Accordingly, other embodiments are within the scope of the following claims.

What is claimed is:

1. An adhesive article comprising:
   (a) a release liner having a surface with an arrangement of structures thereon, wherein the structures extend downward from a plane of the surface, and wherein the structures have at least three sidewalls, wherein a first sidewall makes an angle with respect to the plane of the surface of greater than about 0° and less than 90° and a second sidewall makes an angle with respect to the plane of the surface of greater than 0° and less than about 90°, wherein the first sidewall angle differs from the second sidewall angle by more than about 10°; and
   (b) an adhesive layer on the surface of the release line.

2. The adhesive article of claim 1, wherein the first sidewall angle differs from the second sidewall angle by more than about 20°.

3. The adhesive article of claim 1, wherein the first sidewall angle differs from the second sidewall angle by more than about 30°.

4. The adhesive article of claim 1, wherein the second sidewall makes an angle with respect to the plane of the surface of greater than about 45° and less than about 85°.

5. The adhesive article of claim 1, wherein the second sidewall makes an angle with respect to the plane of the surface of greater than about 50° and less than about 70°.

6. The adhesive article of claim 1, wherein the second sidewall makes an angle with respect to the plane of the surface of greater than about 45° and loss than about 85°, and wherein the first sidewall makes an angle with respect to the plane of the surface of less then about 50°.

7. The adhesive article of claim 6, wherein the first sidewall makes an angle with respect to the plane of the surface of less than about 35°.

8. The adhesive article of claim 1, wherein the structures have a pitch of less than about 2500 micrometers.

9. The adhesive article of claim 1, wherein the structures have a pitch of less than about 350 micrometers.

10. The adhesive article of claim 1, wherein the structures form a substantially continuous and substantially regular pattern on the surface.

11. The adhesive article of claim 1, further comprising a third sidewall, wherein the first sidewall and the third sidewall make an angle with respect to the plane of the surface of less than about 50°.

12. The adhesive article of claim ii, wherein the first and third sidewall angles are substantially equal.

13. The adhesive article of claim 1, further comprising a third sidewall and a fourth sidewall, wherein the first sidewall and the third sidewall make an angle with respect to the plane of the surface of less than about 35°, wherein the first sidewall angle and the third sidewall angle are substantially equal, and wherein the second sidewall and the fourth sidewall make an angle with respect to the plane of the surface of greater than about 45° and less than about 90°, wherein the second sidewall and the fourth sidewall angles are substantially equal.

14. The adhesive article of claim 1, wherein the structures comprise at least four sidewalls, wherein three sidewalls make an angle with respect to the plane of the surface of less than about 50°.

15. The adhesive article of claim 14, wherein the three sidewall angles are substantially equal.

16. The adhesive article of claim 14, wherein the three sidewalls make an angle with respect to the plane of the surface of less than about 35°, wherein the three sidewall angles are substantially equal, and wherein one sidewall makes an angle with respect to the plane of the surface of greater than about 45° and less than about 90°.

17. A release liner having a surface with an arrangement of structures thereon, wherein the structures extend downward from a plane of the surface, and wherein the structures have at least three sidewalls, wherein a first sidewall makes an angle with respect to the plane of the surface of greater than about 0° and less than 90° and a second sidewall makes an angle with respect to the plane of the surface of greater than 0° and less than about 90°, wherein the first sidewall angle differs from the second sidewall angle by more than about 10°.

18. A release liner with a surface comprising an arrangement of pyramidal depressions thereon having a pitch of less than about 350 micrometers, wherein the depressions are capable of adhering to a handling tape at an adhesion value of greater than about 2 N/dm after 5 days at 50° C., as measured by a Prespace Tape Adhesion Test, wherein the pyramidal depressions have a first sidewall that makes an angle with respect to the plane of the surface of about 50° or less and a second sidewall makes an angle with respect to the plane of the surface of greater than about 50° and less than about 90°, wherein the first sidewall angle differs from the second sidewall angle by about 20° or more.

* * * * *

UNITED STATES PATENT AND TRADEMARK OFFICE
CERTIFICATE OF CORRECTION

PATENT NO. : 7,087,279 B2
APPLICATION NO. : 10/621658
DATED : August 8, 2006
INVENTOR(S) : Kenneth J. Callahan It is certified that error appears in the above-identified patent and that said Letters Patent is hereby corrected as shown below:

On Title Page item 56
First Page,
Col. 2, (U.S. Patent Documents), Line 9, After "6,838,142" delete "B1" and insert -- B2 --, therefor.

Column 1,
Line 55, Delete "release," and insert -- release --, therefor.

Column 2,
Line 19, Delete "a," and insert -- a --, therefor.
Line 25, Delete "90°" and insert -- 90°, --, therefor.

Column 3,
Line 38, Delete "11 A" and insert -- 11A --, therefor.

Column 4,
Line 44, Delete "Minn," and insert -- Minn., --, therefor.

Column 7,
Line 7, Delete "+5°" and insert -- ±5° --, therefor.
Line 64, Delete "in-butyl" and insert -- n-butyl --, therefor.

Column 8,
Line 16, Delete "ail" and insert -- an --, therefor.
Line 17, Delete "UW" and insert -- UV --, therefor.

Column 9,
Line 4, Delete "Of" and insert -- of --, therefor.

Column 10,
Line 1, Delete "Onto" and insert -- onto --, therefor.

Column 11,
Line 39 (approx.), Delete "Wetout" and insert -- wetout --, therefor.

Column 12,
Line 7, After "60°/30°" insert -- , --.
Line 21, Delete "91" and insert -- 9.1 --, therefor.

UNITED STATES PATENT AND TRADEMARK OFFICE
CERTIFICATE OF CORRECTION

PATENT NO. : 7,087,279 B2
APPLICATION NO. : 10/621658
DATED : August 8, 2006
INVENTOR(S) : Kenneth J. Callahan It is certified that error appears in the above-identified patent and that said Letters Patent is hereby corrected as shown below:

Column 14,
Line 7, In Claim 1, delete "line." and insert -- liner. --, therefor.
Line 22, In Claim 6, delete "loss" and insert -- less --, therefor.
Line 24, In Claim 6, delete "then" and insert -- than --, therefor.
Line 39, In Claim 12, delete "claim ii" and insert -- claim 11 --, therefor.

Signed and Sealed this

Sixth Day of February, 2007

JON W. DUDAS
*Director of the United States Patent and Trademark Office*